United States Patent
Conway

(10) Patent No.: US 9,466,963 B2
(45) Date of Patent: Oct. 11, 2016

(54) SAFETY CHANNEL FOR BREAKER BOXES

(71) Applicant: Raymond Leonard Conway, Milford, OH (US)

(72) Inventor: Raymond Leonard Conway, Milford, OH (US)

( * ) Notice: Subject to any disclaimer, the term of this patent is extended or adjusted under 35 U.S.C. 154(b) by 91 days.

(21) Appl. No.: 14/072,705

(22) Filed: Nov. 5, 2013

(65) Prior Publication Data
US 2015/0122528 A1     May 7, 2015

(51) Int. Cl.
*H02G 3/14* (2006.01)
*H02G 3/08* (2006.01)

(52) U.S. Cl.
CPC ............... *H02G 3/14* (2013.01); *H02G 3/081* (2013.01)

(58) Field of Classification Search
USPC ..................................................... 174/50, 58
See application file for complete search history.

(56) References Cited

U.S. PATENT DOCUMENTS

| | | | | |
|---|---|---|---|---|
| 2,423,757 A * | 7/1947 | Dedge | .................... | H02G 3/123 220/3.7 |
| 5,740,936 A * | 4/1998 | Nash | ........................ | H02G 3/14 220/3.3 |
| 5,965,845 A * | 10/1999 | Reiker | ............................. | 174/62 |
| 6,420,652 B1 * | 7/2002 | Byczek | ............................. | 174/58 |
| 6,727,428 B2 * | 4/2004 | Archer | .................... | H02G 3/08 174/50 |
| 7,105,742 B1 * | 9/2006 | Jolly | ............................... | 174/50 |
| 7,645,936 B2 * | 1/2010 | Magno, Jr. | ....................... | 174/53 |
| 2002/0162290 A1 * | 11/2002 | Penton | .................. | E04B 2/7457 52/220.2 |

OTHER PUBLICATIONS

Screenshot of Thomas & Betts Corporation (Nashville, TN, USA), Carlon® products of non-metallic indoor and outdoor electrical boxes and enclosures from website https://www.google.com/search?q=carlon+pvc+boxes&biw=1263&bih=859&source=Inms&tbm=isch&sa=X&ved=0ahUKEwiFltn3luHJAhXGYvYKHYiZCIAQ_AUIBypC, available to view online on Jul. 17, 2013 (1 page).

* cited by examiner

*Primary Examiner* — Dhirubhai R Patel
(74) *Attorney, Agent, or Firm* — Hasse & Nesbitt LLC; Daniel F. Nesbitt

(57) ABSTRACT

A breaker box suitable for safely housing an electrical connection. The electrical connection can be made between at least two electrical conductors. The breaker box includes a bottom and a plurality of adjacent side walls, each the side wall being at least partially joined to the bottom and to each adjacent side wall to form an open box. Each side wall can have a top edge wherein the top edges define a box interior and an open box perimeter. At least one the side wall includes a screw connection near the box perimeter, the screw connection including threads for engaging mating threads of a screw. The screw connection can be disposed to receive the screw generally parallel to and adjacent the at least one side wall. A screw guard can be disposed on the side wall, the screw guard encompassing and isolating the screw from the interior when the screw is screwed into the screw connection.

8 Claims, 7 Drawing Sheets

US 9,466,963 B2

SAFETY CHANNEL FOR BREAKER BOXES

FIELD OF THE INVENTION

The invention relates to electrical boxes for housing electrical connections. More specifically, the invention relates to breaker boxes for housing breaker and the associated connections.

BACKGROUND OF THE INVENTION

Electrical boxes for making safe and secure electrical connections are known. For example, metal or plastic boxes, often known as junction boxes, are often used to make connections of household wiring. In particular, for example, so-called "breaker boxes" in which electrical breakers are organized for wiring at a central location, are known. Homes and businesses often have at least one breaker box located near the main electrical supply. Electrical wiring extends from the breakers of the breaker box to various locations throughout the home or business, such as electrical outlets, lighting, light switches, appliances, and the like.

One of the drawbacks with current breaker boxes is the relative ease with which an electrical short can occur when securing the cover or lid in place. The cover is generally screwed on through a threaded screw connection on the breaker box. Wires inside the breaker box can interfere with the incoming screw, a situation which occurs inside the closed box, and is therefore unknown to the person screwing the cover on. In some instances, the screws can penetrate the insulation of the wires inside, causing an electrical short between the contacted wire and the metal breaker box. The electrical short can cause damage to the breaker box, as well as cause physical harm to those near the breaker box.

Accordingly, there is a need for an improved breaker box that minimizes or eliminates the possibility of electrical shorts caused by the insertion and application of cover screws.

Additionally, there is a need for a way to modify existing breaker boxes to be safer against electrical shorts caused by the insertion and application of cover screws.

SUMMARY OF THE INVENTION

A breaker box suitable for safely and efficiently housing an electrical connection is disclosed. The electrical connection can be made between at least two electrical conductors. The breaker box includes a bottom and a plurality of adjacent side walls, each the side wall being at least partially joined to the bottom and to each adjacent side wall to form an open box. Each side wall can have a top edge wherein the top edges define a box interior and an open box perimeter. At least one the side wall includes a screw connection near the box perimeter, the screw connection including threads for engaging mating threads of a screw. The screw connection can be disposed to receive the screw generally parallel to and adjacent the at least one side wall. A screw guard can be disposed on the side wall, the screw guard encompassing and isolating the screw from the interior when the screw is screwed into the screw connection.

DETAILED DESCRIPTION OF THE INVENTION

Figure 1:
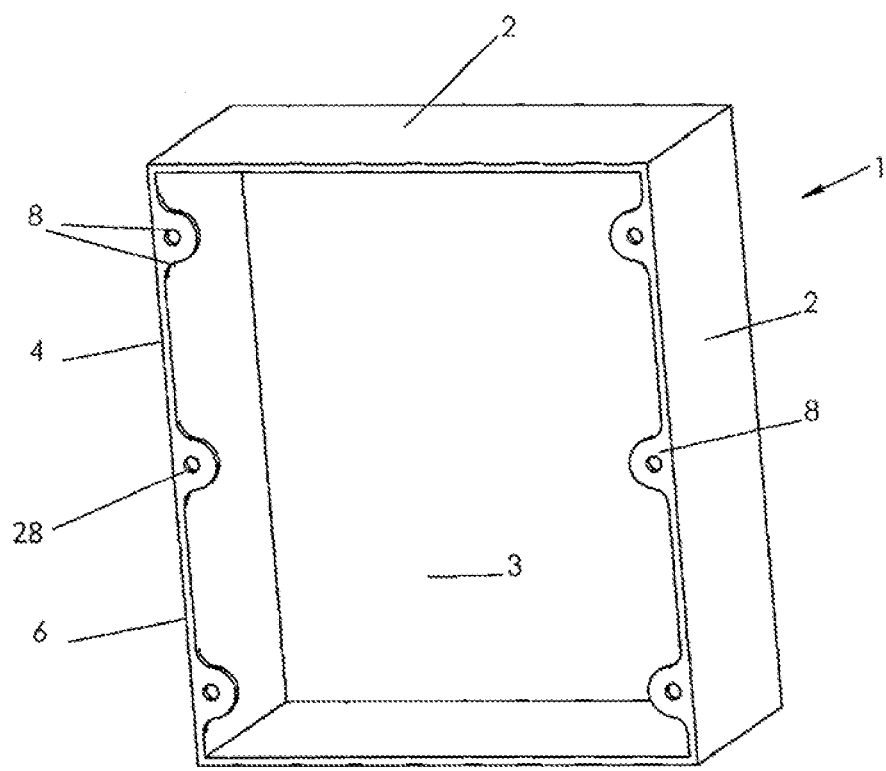
FIG. 1 is a perspective view of an embodiment of breaker box.
Figure 2:
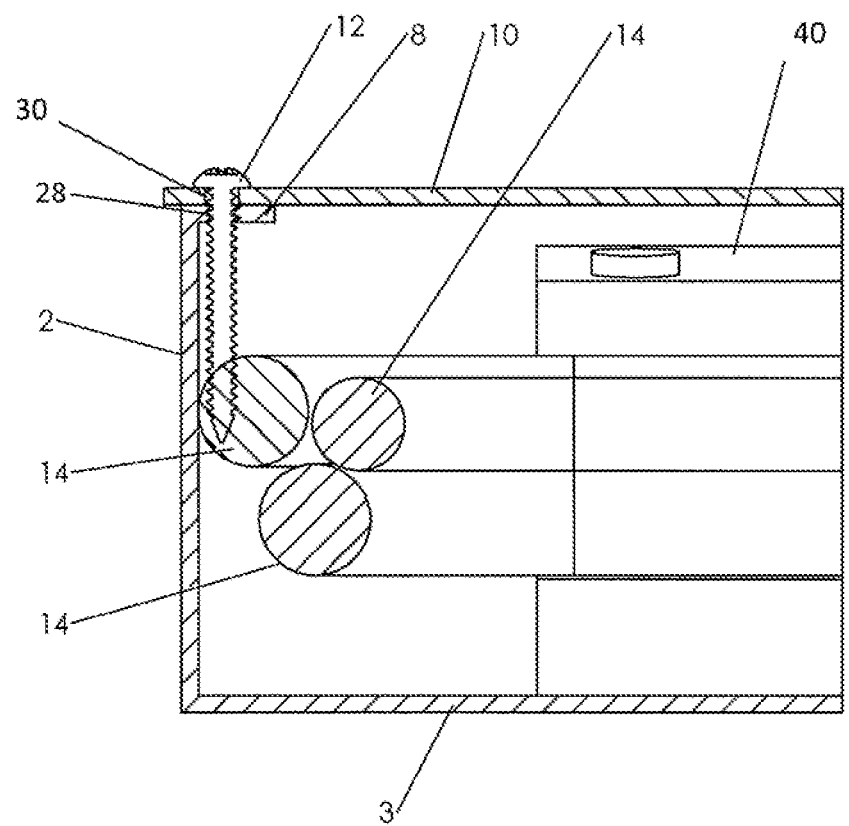
FIG. 2 is a partial cross-sectional view of an embodiment of a breaker box.
Figure 11:
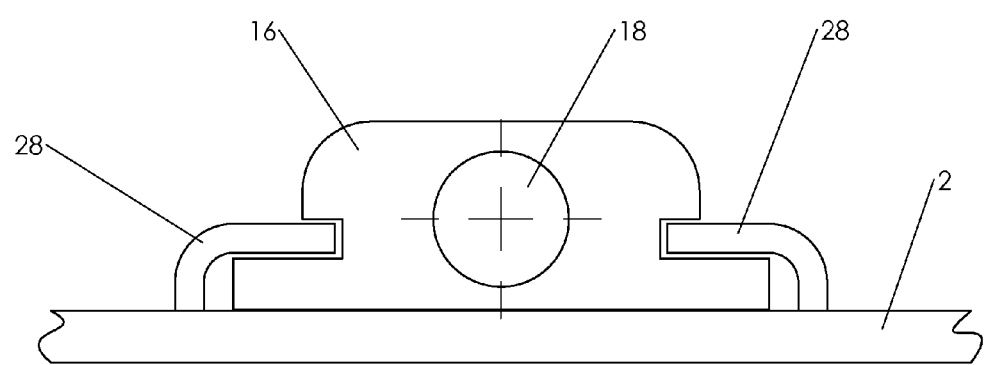
FIG. 11 is a top view of a portion of a side wall and screw isolator of the present invention.

One embodiment of a breaker box 1 of the present invention is shown in FIG. 1. As shown, box 1 has side walls 2 joined to a bottom 3, which together form an open container. Although FIG. 11 shows a typical arrangement of four side walls 2 forming a rectangular box 1, the invention, is not limited only to such a typical configuration. In general, any configuration of three or more side walls 2 will suffice. The top edges 4 of side walls 2 define a peripheral open edge 6 of the open container. At least one screw connection 8 can be disposed at or near the top edge 4 of at least one side wall 2. The screw connection can comprise, for example, a threaded opening 28 designed to receiving a mating screw having threads 22, as described below with respect to FIG. 2. The screw connection has as one of its purposes facilitating screwing on a cover 10. Boxes of the type shown in FIG. 1 can be referred to as junction boxes or breaker boxes, and can be used, for example, in homes or businesses. Typically a breaker box 10 will have mounted in the open container portion at least one breaker. Wires can be attached to a breaker and run from the breaker to various places in the home or business, as is well known in the art.

In a proper installation, breaker box 1 is fitted with a cover which can be screwed on to completely cover the interior open container portion of box 1. As shown in partial cross section, for example, in FIG. 2, a cover 10 can be screwed to box 1 by use of a screw 12 connector inserted through a hole 30 in cover 10 and screwed into screw connection 8, which can be a portion of side wall 2 bent to a right angle with respect to side wall 2 and extended inwardly to facilitate a screw connection, as shown. In general, screw connection 8 need extend inwardly from side wall 2 a distance sufficient to provide a hole, such as a threaded hole 28, for screw 12 to engage.

When the cover is placed in position, the interior portion of box 1 is then hidden, and wiring inside the box cannot be seen. When screw(s) 12 are tightened sufficient to hold cover 10 tightly to screw connection 8, the tip of screw(s) 12 extend into box 1, and can come in contact with wires 14, three of which are indicated in representative positions in dashed lines as they each exit a breaker 40 in FIG. 2. As can be seen, as wires 14, which can often be large and stiff, can be in the path of the tightening screw, and it is possible for the screw to penetrate insulation of at least one wire 14, thereby causing an electrical short between the conductor of wire 14 and box 1.

Figure 3:
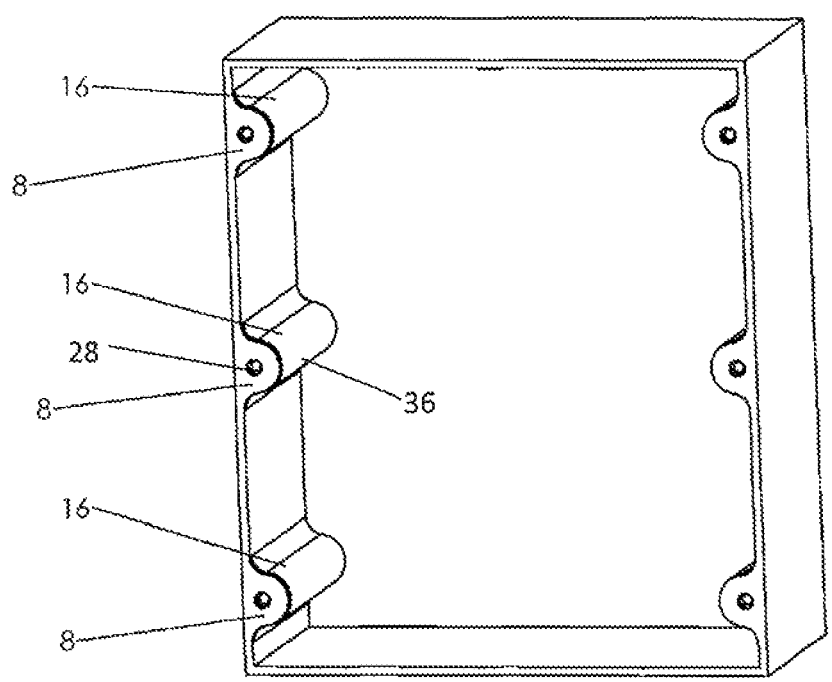
FIG. 3 is a perspective view of a breaker box of the present invention.

As shown in FIG. 3, a solution to the problem of screw(s) 1.2 penetrating the insulation, of conductors and causing an electrical short is shown. Screw isolators, also referred to herein as screw guards 16 can be disposed in a location on box 1 such that wires 14 inside box 1 cannot come in contact with screws 12. As shown, a box with six screw connections 8 is shown. For one or more screw connections 8 a screw guard 16 can be attached to side wall 2 and/or bottom. 3 to isolate screw(s) 12 from wires 14. That is, each screw guard 16 creates a space to receive screw 12 but extends a distance along side wall 2 so as to prevent wires 14 from coming in contact with the screw 12.

Figure 4:
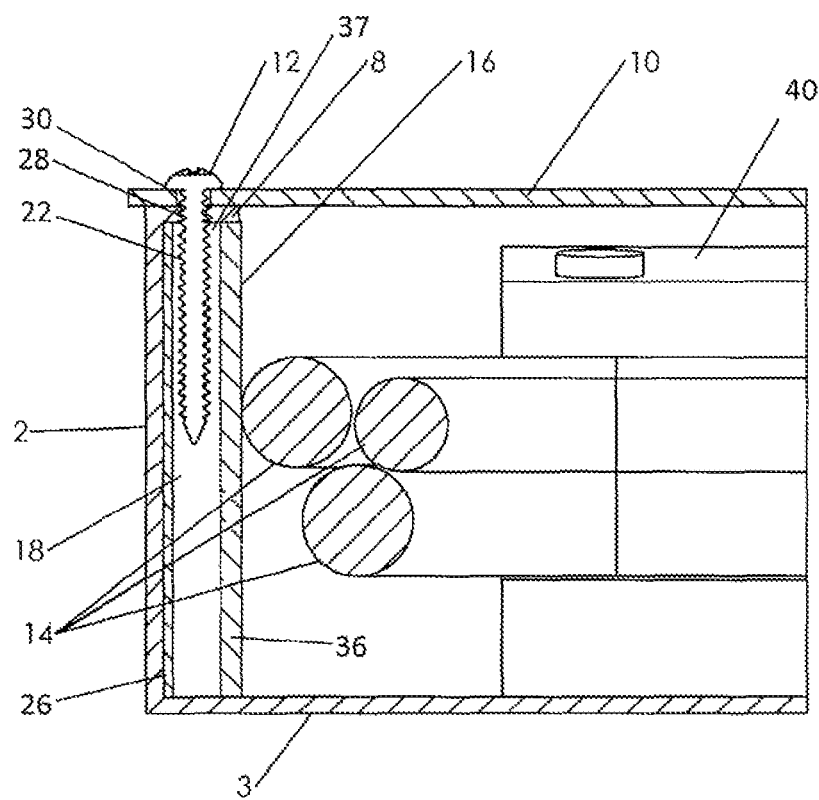
FIG. 4 is a partial cross-sectional view of an embodiment of a breaker box of the present invention.
Figure 5:
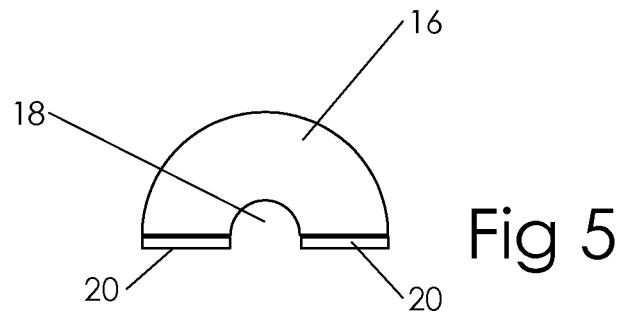
FIGS. 5-9 are exemplary cross-sectional views of screw isolators of the present invention.
Figure 6:
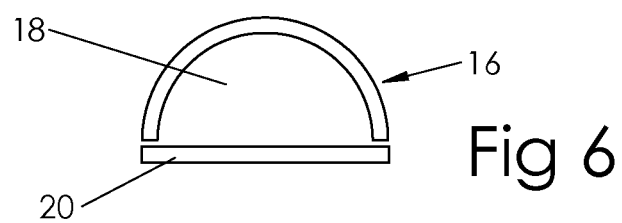
Figure 7:
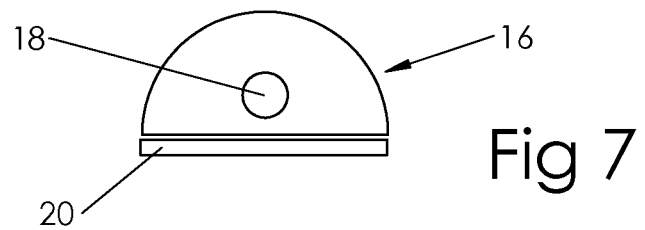
Figure 8:
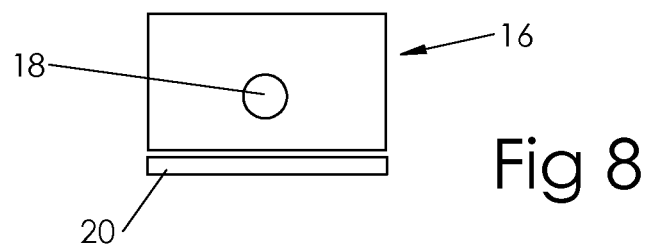
Figure 9:
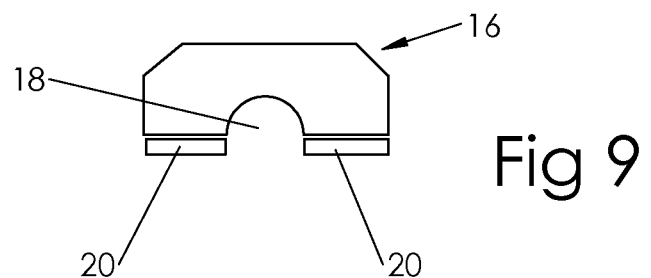

An exemplary configuration of screw guard 16 in an in-use position is shown in FIG. 4. As shown, screw 12 attaches cover 10 to screw connection 8 and extends into box 1 inside an interior portion 18 of screw guard 16. As shown, wires 14 are displaced away from screw guard 16 and therefore are isolated from screw 12. In this manner the chance of a short between box 1 and the conductor of wire 14 via screw 12 is minimized or eliminated.

Screw guard can be an elongated member 36 made of a non-conductive material such as a polymer. The polymeric member can be molded, extruded, or otherwise formed to a shape having a cross-section of virtually any shape, including those shown in FIGS. 5-9. That is, the actual cross-sectional shape and dimensions are not critical except that at least one interior portion 18 is defined such that a screw 12 can extend unimpeded through an opening 37 inside screw guard 16. In an embodiment, screw guard can be a solid member, and screw 12 can be screwed into screw guard to thereby be isolated from any potential contact with wires 14.

Regardless of cross-sectional shape or other dimension such as length and width, screw guard 16 can be attached, joined, adhered, or otherwise positioned on sidewall 2 and or bottom 3 by any known means, such as by screwing, welding, or gluing. In an embodiment, at least a portion of screw guard. 16 has a generally flat surface 26 having adhered thereto an adhesive substance 20. In an embodiment, adhesive substance is part of double-back adhesive tape, and can have a release strip applied to exposed surfaces to protect the adhesive prior to use.

Figure 10:
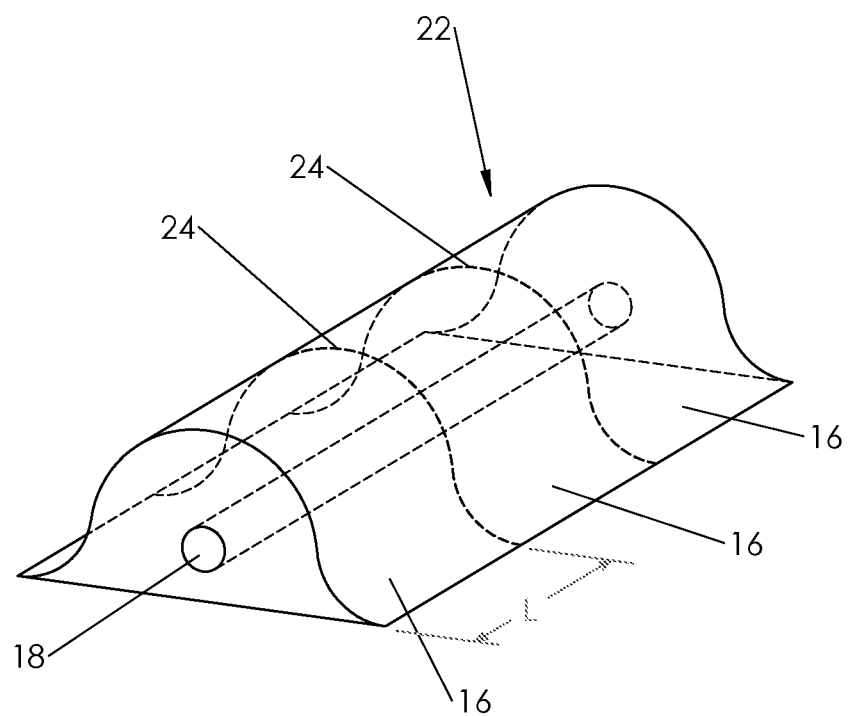
FIG. 10 is a perspective view of screw isolators of the present invention.

In an embodiment, screw guards 16 can be manufactured by extruding a polymeric material such as polyethylene or polypropylene into an elongated "stick" 22 form, such as shown in FIG. 10. The stick 22 of polymeric material can have lines of weakness 24 formed across a surface thereof, such as a groove or perforated line. The stick 22 can be produced and sold in lengths of multiple lengths L of a suitable-sized screw guard. When ready use, a user, such as an electrician, can break off one screw guard. 16 having a length L. If supplied with an adhesive and release paper, the user then can remove the release paper and adhere the screw guard to the side 2 of box 1 at the appropriate location. In general length L can be from about 1 inch to about 6 inches for most applications, or from about 2 inches to about 4 inches, or about 3 inches. Interior portion 18 can have an effective opening 37, or an effective diameter sized, to fit generally used screws for home or business breaker boxes, and can be about ½ inch to about 1 inch, or from about ¼ inch to about ¾ inch. "Effective opening" can be, for example, a greatest dimension of an irregularly shaped opening, or the diameter of a circular opening.

In an embodiment, screw guards 16 can be manufactured by extruding a polymeric material such as polyethylene or polypropylene into an elongated "stick" 22 form, such as shown in FIG. 10, with dimensions and/or cross sectional shape that permit the screw guard to be slid into position between rails mounted to sides 2. As shown in FIG. 11, for example, rails 28 can be welded or otherwise joined to side 2 in a spaced apart orientation such that a screw guard 16 can be slid in from the top to be held in place between rails 28. Of course, any configuration of rails, shapes, spacing, and other modifications could be made while not departing from the scope of the invention. For example, the rails could be designed such that screw guards can slip in, but cannot slip out, such as by incorporating one-way "teeth" that engage with corresponding teeth on the screw guard to allow one-way sliding.

After all desired screw guards 16 are attached to sides 2 and/or bottom 3 of box 1, the cover 10 can be placed in position and screws 12 inserted and screwed down tight without fear of, or even possibility of, shorting to hidden wires inside box 1.

Other known variations can be made to a breaker box 1 of the present invention without departing from the scope of the invention. In general, therefore, any of known modifications to current electrical or junction boxes can be made to the box of the present invention.

I claim:

1. An improvement to an existing breaker box that includes: a bottom wall, a plurality of side walls, each of said side walls being at least partially joined to said bottom wall and to adjacent said side walls to form an open box, each of said side walls having a top edge wherein the top edges of the plurality of said side walls define a box interior and an open box perimeter, and an inwardly-extending portion of the top edge of a pair opposed said side walls extends inwardly and has a threaded hole in the inwardly-extending portion to form a screw connection to engage a mating thread of a screw that extends generally parallel to and adjacent the opposed said side wall when the screw is received in the threaded hole; a cover having holes that align with the threaded holes of the screw connections when the cover is positioned over the open box perimeter; a plurality of electrical breakers mounted to the bottom wall in the box interior, and a plurality of insulated wires that are attached electrically to each of the plurality of breakers and that extend out through the breaker box;

the improvement comprising a screw guard including an elongated member made of a non-conductive material, disposed in a location between the bottom wall and the inwardly-extending portion, and adjacent the opposed side wall, the screw guard including a flat attaching surface positioned against and attached to the opposed side wall, and a cross-sectional shape that occupies a space around the screw and that has an interior portion with an opening to receive uninmpededly the screw inside the screw guard when the screw is received in the threaded hole, wherein the screw guard encompasses and isolates the screw from the box interior, and prevents contact and penetration of the screw with and through the insulation of the wires within the breaker box.

2. The breaker box of claim 1, wherein said screw guard comprises polymeric material.

3. The breaker box of claim 1, wherein said screw guard comprises a polymer selected from the group consisting of polyethylene or polypropylene.

4. The breaker box of claim 1, wherein said opposed side wall has joined thereto a pair of opposing rails positioned to receive the screw guard where the cross-sectional shape is received and held by said opposing rails.

5. The breaker box of claim 1, wherein said screw guard comprises an adhesive material on the flat attaching surface that adheres the screw guard on said opposed side wall.

6. The breaker box of claim 1, wherein the inwardly-extending portion extends at a right angle to the opposed side walls.

7. The method according to claim 1, wherein the screw guard is made of a non-conductive material.

8. The method according to claim 1, wherein the elongated member has a curved surface.

* * * * *

UNITED STATES PATENT AND TRADEMARK OFFICE
CERTIFICATE OF CORRECTION

| | | |
|---|---|---|
| PATENT NO. | : 9,466,963 B2 | Page 1 of 1 |
| APPLICATION NO. | : 14/072705 | |
| DATED | : October 11, 2016 | |
| INVENTOR(S) | : Raymond Leonard Conway | |

It is certified that error appears in the above-identified patent and that said Letters Patent is hereby corrected as shown below:

In the Specification

Column 2, Line 18, delete "FIG. 11" and insert --FIG. 1--.

Column 2, Line 61, delete "1.2" and insert --12--.

Column 3, Line 51, delete "1/2" and insert --1/8--.

In the Claims

Column 4, Line 44, delete "uninmpededly" and insert --unimpededly--.

Signed and Sealed this
Seventh Day of March, 2017

Michelle K. Lee
*Director of the United States Patent and Trademark Office*